(12) United States Patent
Belzile et al.

(10) Patent No.: US 8,167,609 B2
(45) Date of Patent: May 1, 2012

(54) MOLD-TOOL SYSTEM HAVING A MELT-SPLITTING DEVICE INCLUDING UNINTERRUPTED MELT CHANNELS EXTENDING FROM A MELT INLET TO A PLURALITY OF MELT OUTLETS

(75) Inventors: Manon Danielle Belzile, Fairfield, VT (US); Darrin MacLeod, Jeffersonville, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 50 days.

(21) Appl. No.: 12/913,800

(22) Filed: Oct. 28, 2010

(65) Prior Publication Data

US 2011/0135781 A1 Jun. 9, 2011

Related U.S. Application Data

(60) Provisional application No. 61/392,502, filed on Oct. 13, 2010, provisional application No. 61/267,581, filed on Dec. 8, 2009.

(51) Int. Cl.
*B29C 45/22* (2006.01)

(52) U.S. Cl. .................................... 425/572; 264/328.8
(58) Field of Classification Search .................. 425/572, 425/549; 264/328.8
See application file for complete search history.

(56) References Cited

U.S. PATENT DOCUMENTS

| | | | | |
|---|---|---|---|---|
| 4,219,323 A | * | 8/1980 | Bright et al. | .................. 425/572 |
| 4,965,028 A | | 10/1990 | Maus et al. | |
| 5,683,731 A | | 11/1997 | Deardurff et al. | |
| 6,149,423 A | | 11/2000 | Manz | |

OTHER PUBLICATIONS

Mold Masters Pamphlet entitled "Your Connection! . . . To Injection Molding Excellence: Modular Manifolds & Master-Probe Nozzle Probes", Apr. 1986, pp. 1-40.*

* cited by examiner

*Primary Examiner* — Tim Heitbrink

(57) ABSTRACT

A mold-tool system (100), comprising: a melt splitting device (102) being configured to interact with a melt distribution device (105), the melt splitting device (102) having: a single inlet (106); multiple outlets (108) being set apart from the single inlet (106), the multiple outlets (108) being configured for fluid communication with the melt distribution device (105); and uninterrupted melt channels (110) extending from the single inlet (106) and the multiple outlets (108).

14 Claims, 10 Drawing Sheets

US 8,167,609 B2

Figure 1:
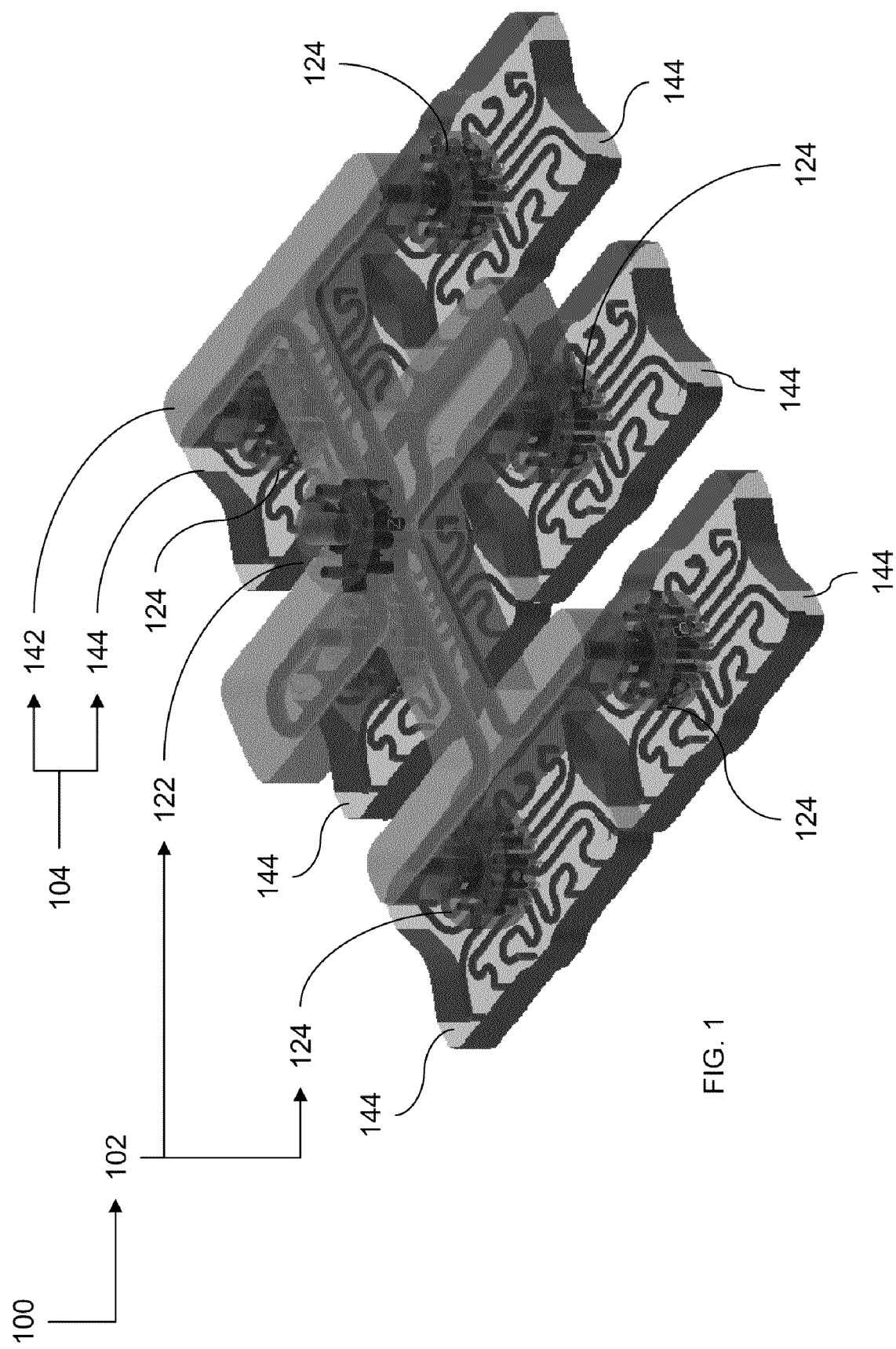

MOLD-TOOL SYSTEM HAVING A MELT-SPLITTING DEVICE INCLUDING UNINTERRUPTED MELT CHANNELS EXTENDING FROM A MELT INLET TO A PLURALITY OF MELT OUTLETS

CROSS-REFERENCE TO RELATED PATENT APPLICATION(S)

This patent application is continuation-in-part patent application of prior U.S. Patent Application No. 61/392502 filed 13 Oct. 2010. This patent application also claims the benefit and priority date of prior U.S. Patent Application No. 61/392502 filed 13 Oct. 2010. This patent application is also a continuation-in-part patent application of prior U.S. Patent Application No. 61/267581 (Applicant's reference No. HA955-0-US-P), filed 8 Dec. 2009. This patent application also claims the benefit and priority date of prior U.S. Patent Application No. 61/267581 filed 8 Dec. 2009.

TECHNICAL FIELD

An aspect generally relates to (and is not limited to) mold-tool systems including (and not is limited to) a mold-tool system having uninterrupted melt channels extending from an inlet and outlets.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

According to one aspect, there is provided a mold-tool system (100), comprising: a melt splitting device (102) being configured to connect with a manifold assembly (104), the melt splitting device (102) having: a single inlet (106); multiple outlets (108) that are set apart from the single inlet (106); and uninterrupted melt channels (110) extending from the single inlet (106) and the multiple outlets (108).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

Figure 6:
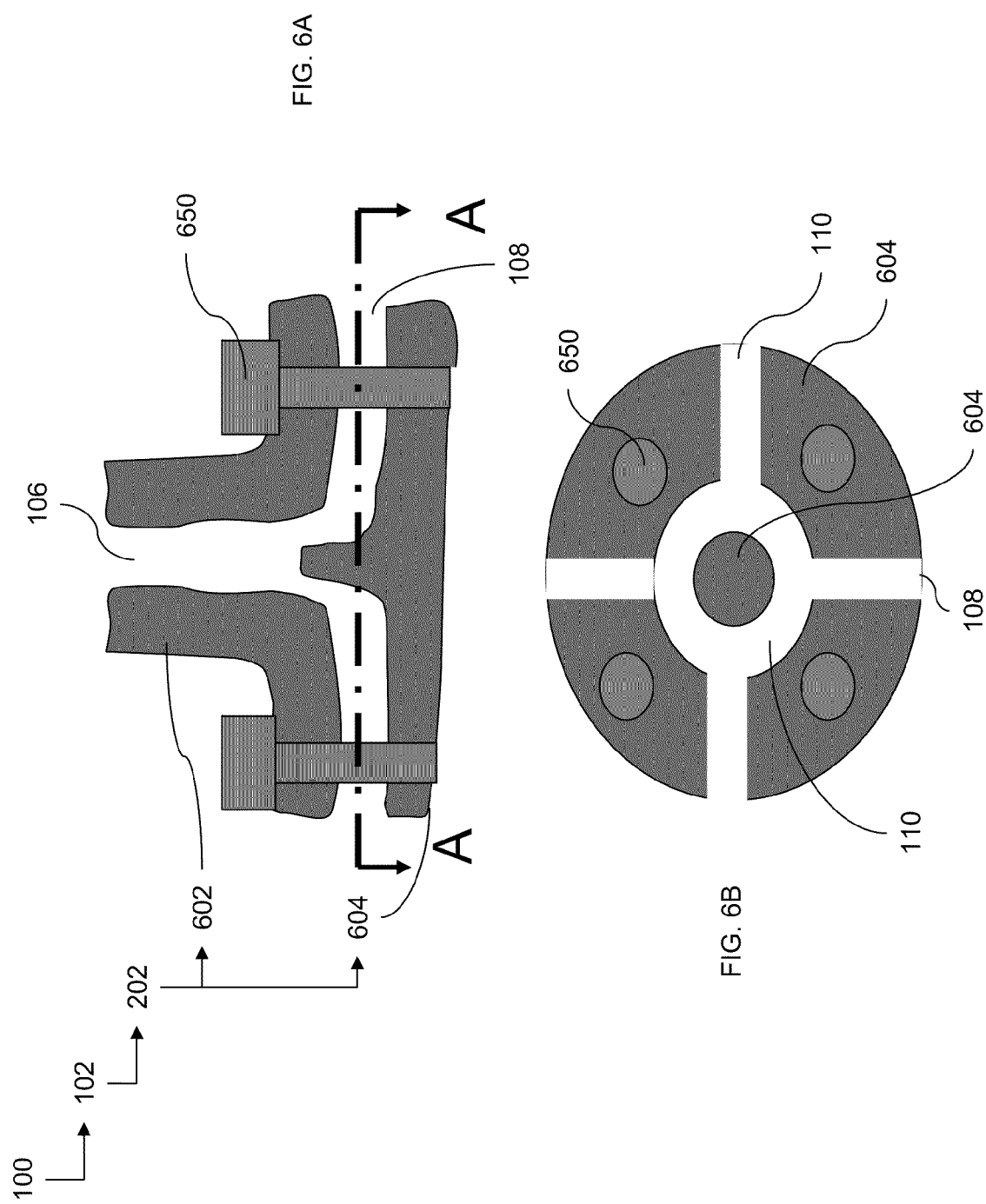
Figure 7:
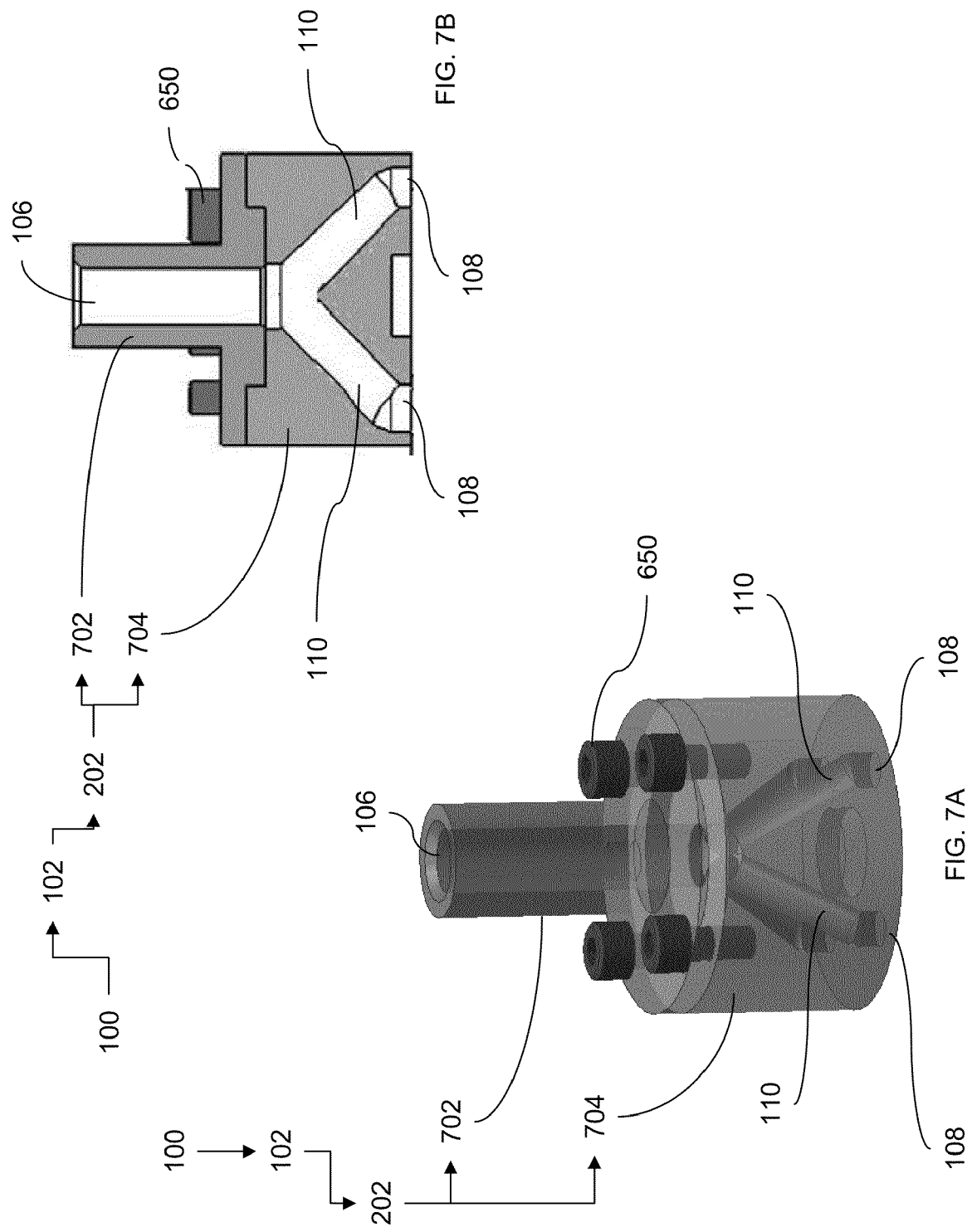
Figure 8:
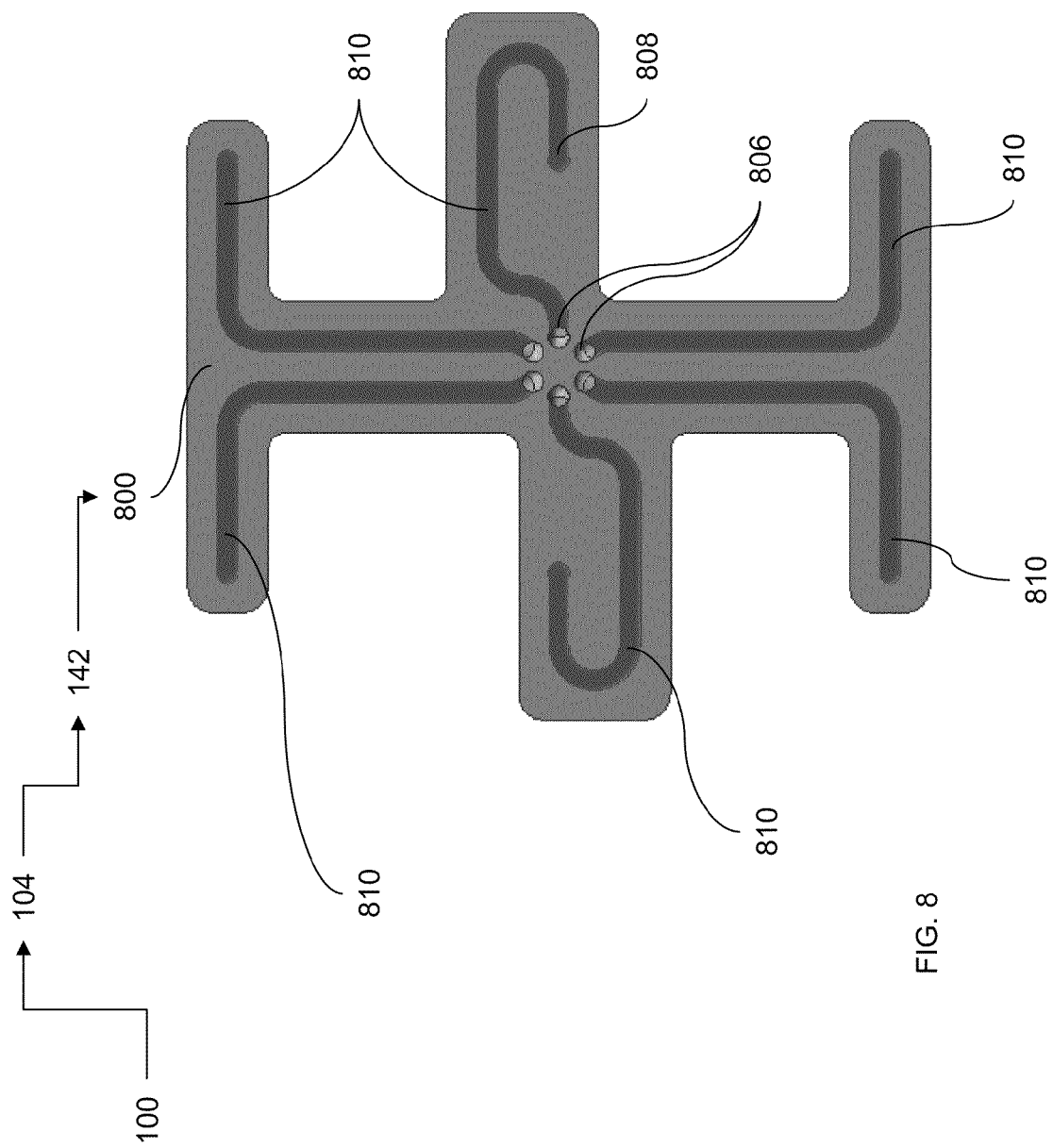
Figure 9:
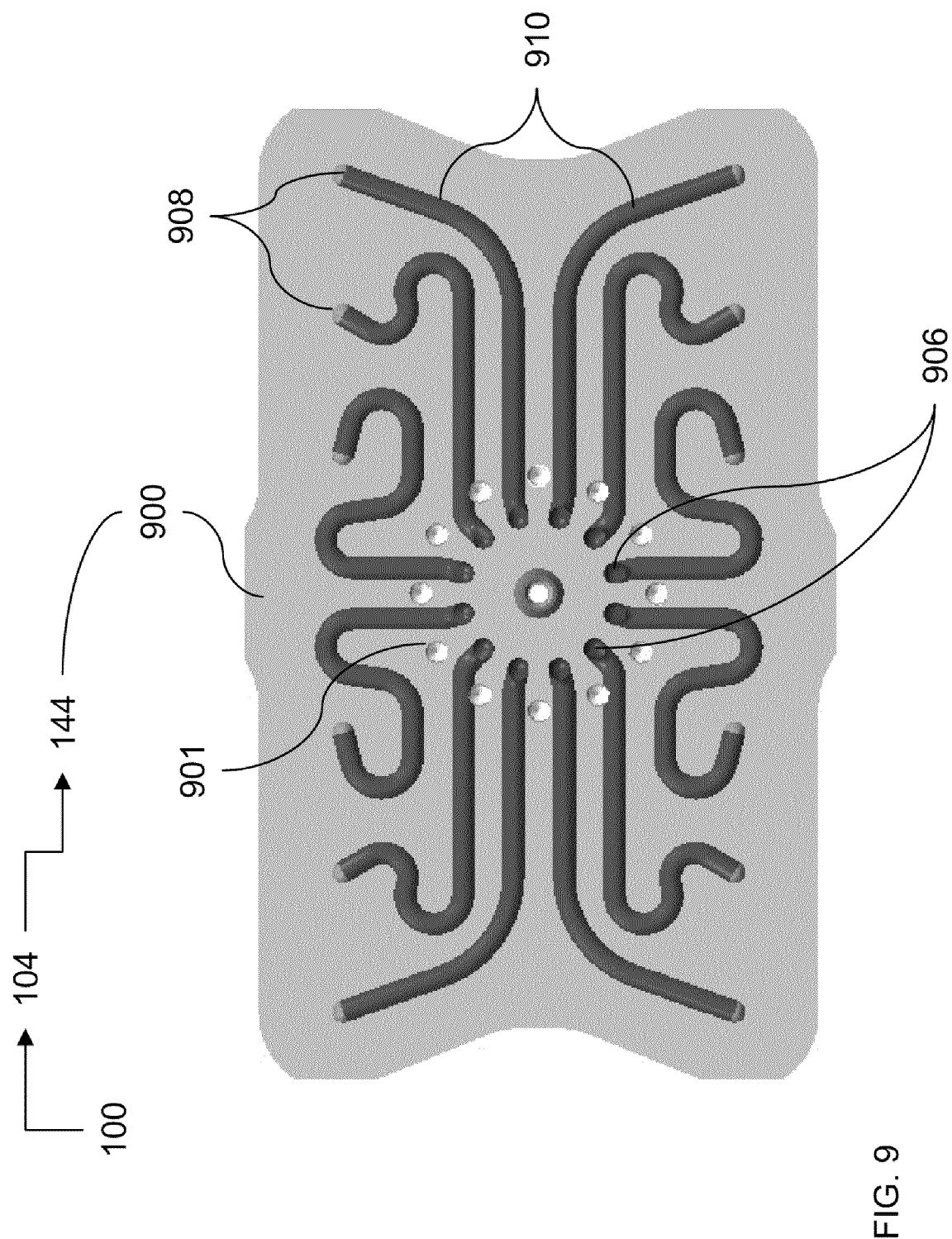

The non-limiting embodiments will be more fully appreciated by reference to the following detailed description of the non-limiting embodiments when taken in conjunction with the accompanying drawings, in which:

FIGS. 1, 2, 3, 4, 5A, 5B, 6A, 6B, 7A, 7B, 10 depict schematic representations of the examples of a mold-tool system (100) having a melt splitting device (102); and FIGS. 8 and 9 depict other schematic representations of the examples of a mold-tool system (100) having a manifold assembly (104).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the schematic representation of the mold-tool system (100). The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The mold-tool system (100) may be implemented as a hot runner system or may be implemented as a cold runner system. The mold-tool system (100) is a system that is supported by a platen assembly (known but not depicted) of a molding system (known and not depicted), such as an injection molding system.

FIG. 1 depicts a perspective view of an example of the mold-tool system (100). The mold-tool system (100) may include (and is not limited to): a melt splitting device (102). According to the example depicted in FIG. 1, the melt splitting device (102) includes (and is not limited to): an upper melt splitting device (122), and a plurality of lower melt splitting device (124). The mold-tool system (100) may also include (and is not limited to): a manifold assembly (104). The manifold assembly (104) may include (and is not limited to): a cross manifold assembly (142), and a plurality of main manifold assemblies (144). The upper melt splitting device (122) is configured for connection with a melt preparation device, such as (for example) an injection unit (known and not depicted) of an injection molding system (known and not depicted). The upper melt splitting device (122) may be connected with the cross manifold assembly (142). The plurality of lower melt splitting devices (124) may connect the cross manifold assembly (142) with a respective one of the plurality of main manifold assemblies (144). It will be appreciated that the mold-tool system (100) as depicted in FIG. 1 is an example (for illustration purposes).

Figure 2:
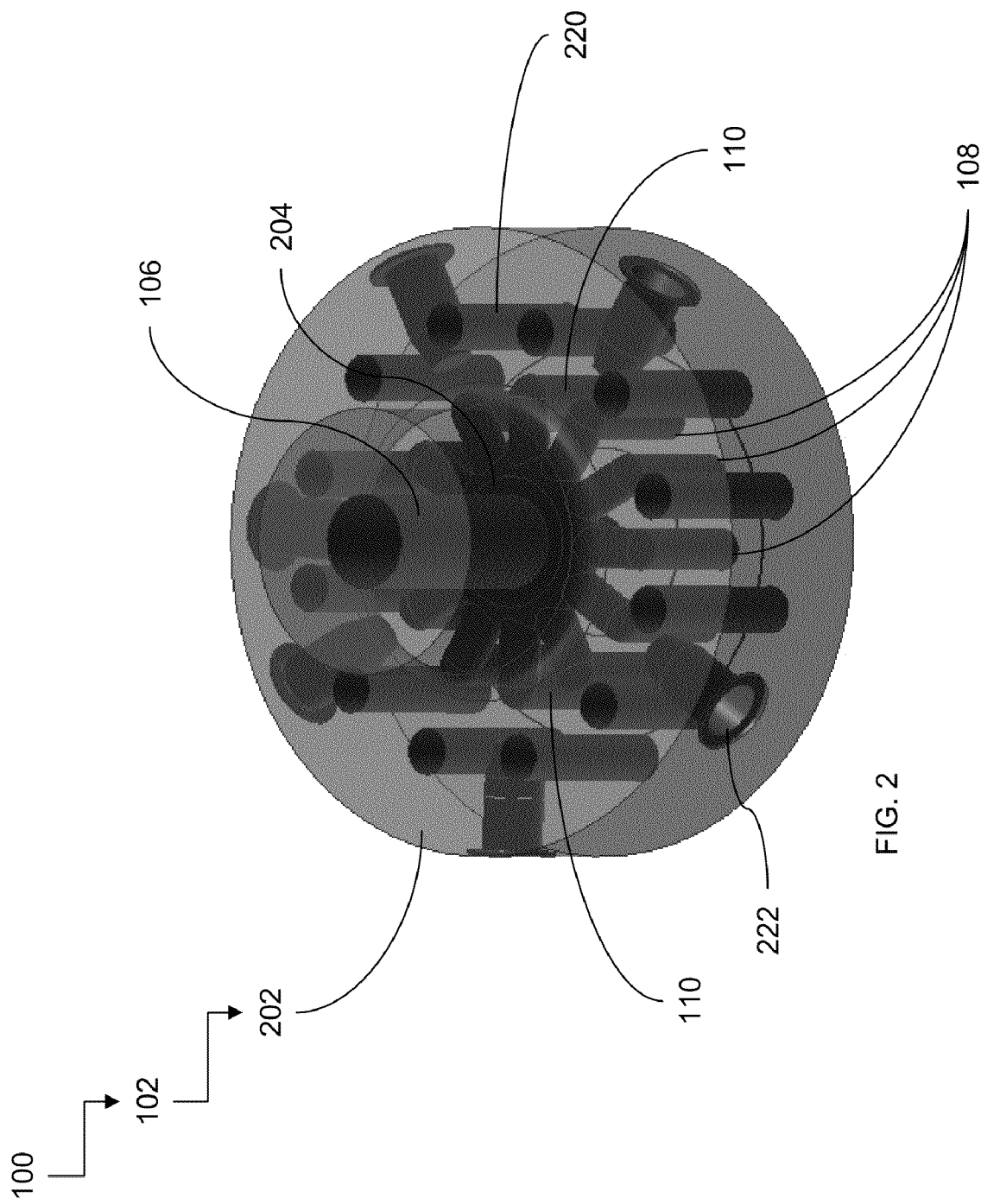

FIG. 2 depicts a perspective view of an example of the mold-tool system (100), in which an example of the inner arrangement or inner structure of the melt splitting device (102) is depicted. According to the example depicted in FIG. 2 (generally speaking), the mold-tool system (100) may include (and is not limited to): a melt splitting device (102) that is configured to interact with a melt distribution device (105). By way of example, the melt distribution device (105) may include (and is not limited to) a manifold assembly (104). The melt splitting device (102) may have (and is not limited to): (i) a single inlet (106), (ii) multiple outlets (108)

that are set apart from the single inlet (106), and (iii) uninterrupted melt channels (110) extending from the single inlet (106) and the multiple outlets (108). The multiple outlets (108) are configured for fluid communication with the melt distribution device (105) such as the manifold assembly (104). The melt splitting device (102) may be, for example, connected to hoses or other types of channels.

The definition of the uninterrupted melt channels (110) is as follows: there are no melt-channel intersections between the uninterrupted melt channels (110) so that there is no mixing or flow of a melt (resin) between the uninterrupted melt channels (110); that is, there is no inter-channel mixing between the uninterrupted melt channels (110). The uninterrupted melt channels (110) are channels that have no breaks in the uninterrupted melt channels (110) so as to avoid causing a split (or a branching) in the flow of a melt flowing along the uninterrupted melt channels (110). A technical effect of the foregoing is that each of the multiple outlets (108) may have similar melt flow front profiles (that is, thermal profiles). The melt splitting device (102) may be manufactured using additive manufacturing methods (such as 3D printing, etc) or by traditional manufacturing methods (such as gun drilling), etc.

The mold-tool system (100) may, optionally, be arranged such that the melt splitting device (102) includes a material that has a thermal conductivity that is different from the thermal conductivity of the material included in the manifold assembly (104), depending on the technical performance that may be required from the melt splitting device (102). For example, the melt splitting device (102) may include a material that is either higher or that is lower than the thermal conductivity than the material included in the manifold assembly (104), depending a specific requirement. For example, for the case where is it desired to avoid applying heater to the melt splitting device (102), a relatively high thermal conductivity may be used in the material of the melt splitting device (102) relative to the material in the manifold assembly (104). For example, for the case where it is desired to insulate the resin from excessive heat, a relatively lower thermal conductivity may be used in the material of the melt splitting device (102) relative to the material use din the manifold assembly (104).

In addition, but not limited to, the melt splitting device (102) may be made from multiple pieces that are then joined by brazing, welding, bolted, screwed, press fitting, etc.

The mold-tool system (100) may be, optionally, arranged such that the melt splitting device (102) includes a material that has a fatigue strength that is different than the fatigue strength of the material included in the manifold assembly (104). A higher fatigue strength for the material may be used in the melt splitting device (102) for the case where mechanical stresses are excepted to be relatively higher. Also, for the case where mechanical stresses may not be an issue, then the fatigue strength of the material used in the melt splitting device (102) may be the same as the fatigue strength of the material used in the manifold assembly (104).

FIG. 2 depicts a perspective view of another example of the mold-tool system (100), in which the melt splitting device (102) may include (and is not limited to): (i) a melt splitting device body (202) defining the single inlet (106) and the multiple outlets (108), and (ii) a melt splitting zone (204) connecting the single inlet (106) with the uninterrupted melt channels (110). Each of the uninterrupted melt channels (110) that are connected with a respective outlet (108) of the multiple outlets (108). The uninterrupted melt channels (110) may radiate axially outwardly from a direction that is perpendicular to a central axis extending through the single inlet (106). The melt splitting device body (202) may define a connection hole (220) that is configured to permit connection of the melt splitting device body (202) to the manifold assembly (104) that is depicted in FIG. 1. The connection hole (220) may accommodate a connection device, such as bolt, etc. A plug (222) may be used seal and divert the melt flow in the uninterrupted melt channels (110), for the case where the uninterrupted melt channels (110) were gun drilled.

Figure 3:
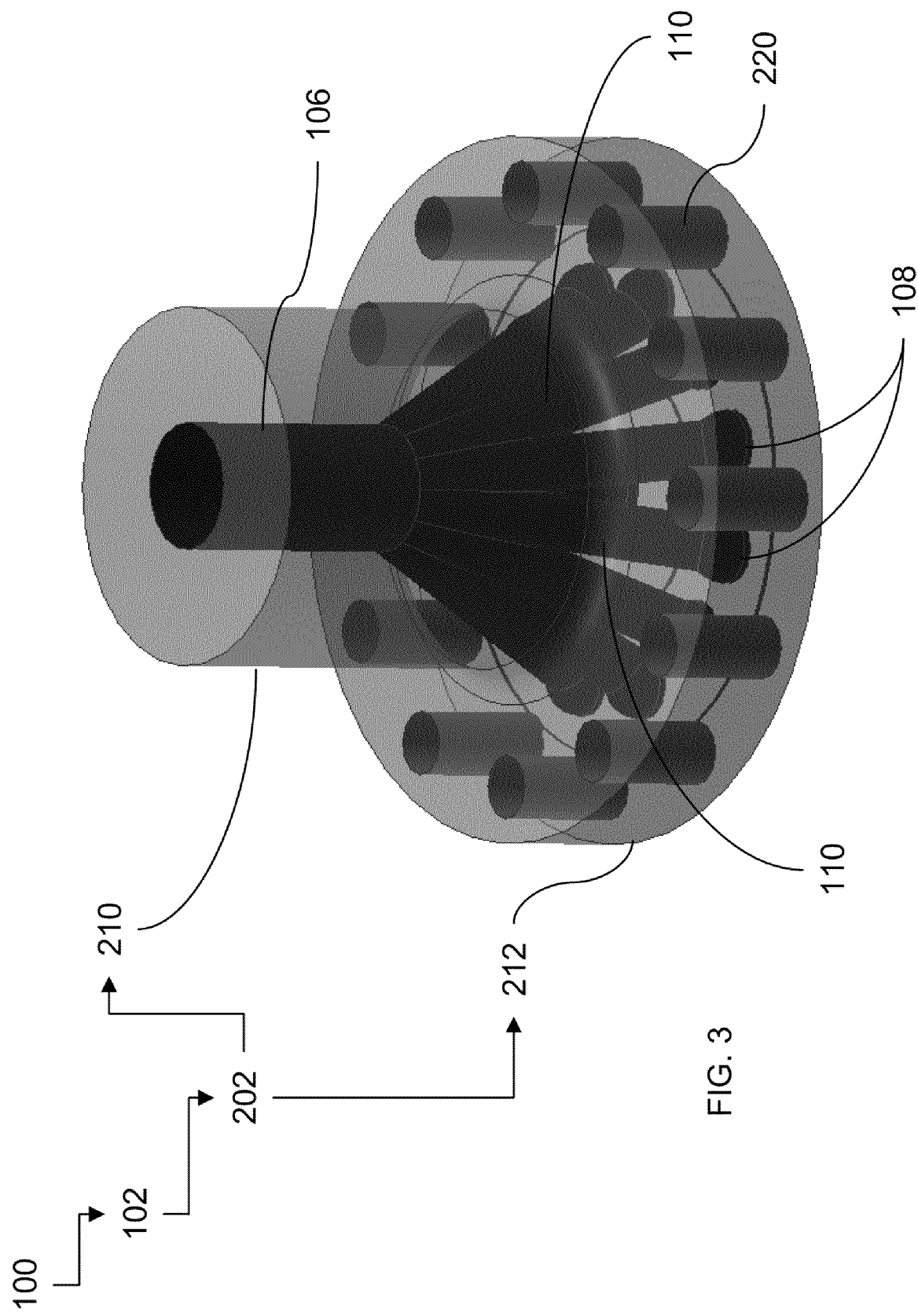

FIG. 3 depicts a perspective view of another example of the mold-tool system (100), in which the melt splitting device (102) may include (and is not limited to): (i) an upper body (210), and (ii) a lower body (212). The upper body (210) may define the single inlet (106). The lower body (212) may define the uninterrupted melt channels (110) and the multiple outlets (108). The uninterrupted melt channels (110) may radiate symmetrically axially outwardly along an accurate angle relative to a central axis of the single inlet (106).

Figure 4:
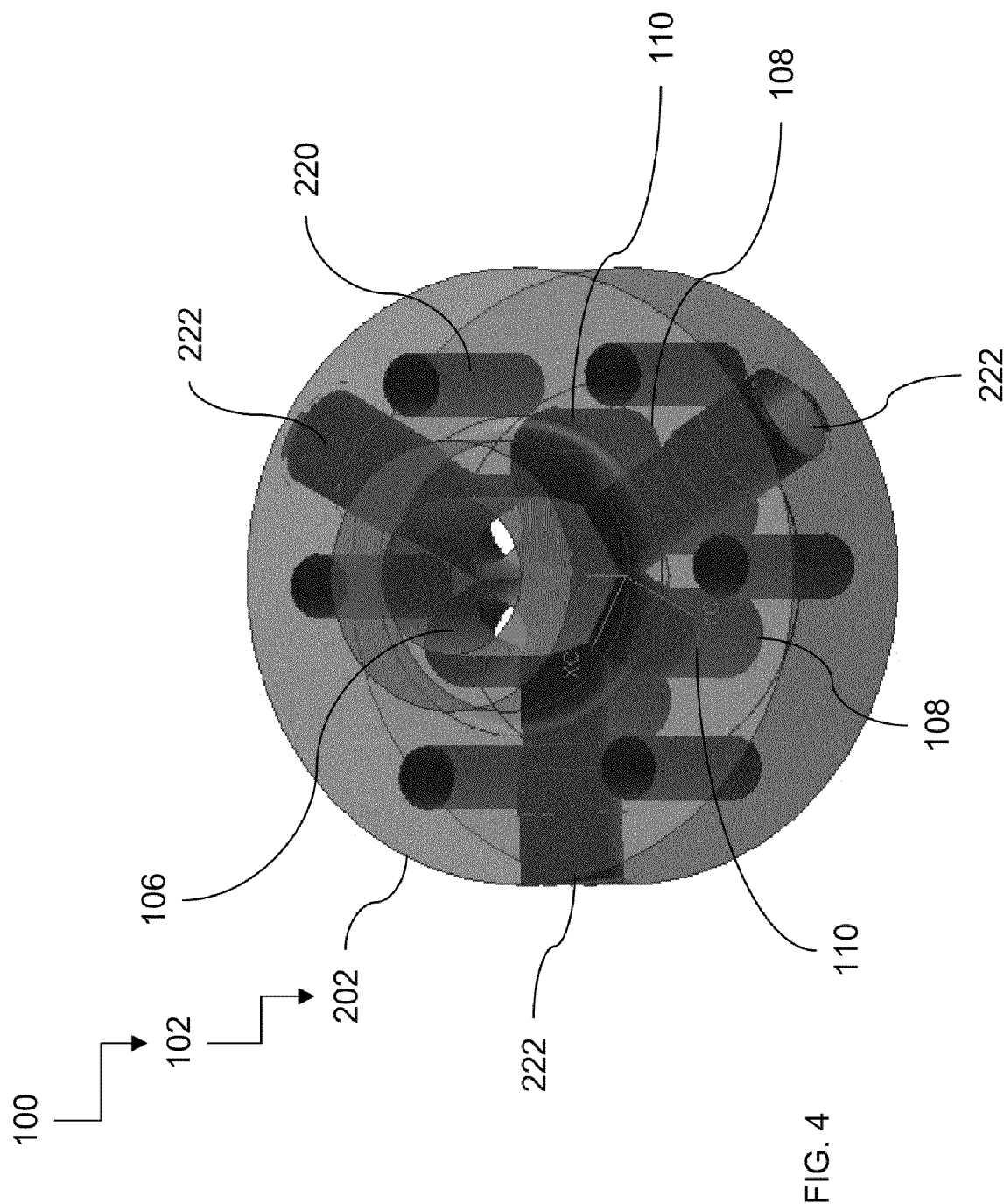

FIG. 4 depicts a perspective view of another example of the mold-tool system (100), in which the example depicted in FIG. 4 is similar the example depicted in FIG. 2, with the difference being that the example depicted in FIG. 4 is a six way split, while the example depicted in FIG. 2 is a 12 way split.

FIG. 4 depicts a perspective view of another example of the mold-tool system (100), in which the example depicted in FIG. 4 is similar the example depicted in FIG. 2, with the difference being that the example depicted in FIG. 4 is a six way split, while the example depicted in FIG. 2 is a 12 way split.

Figure 5:
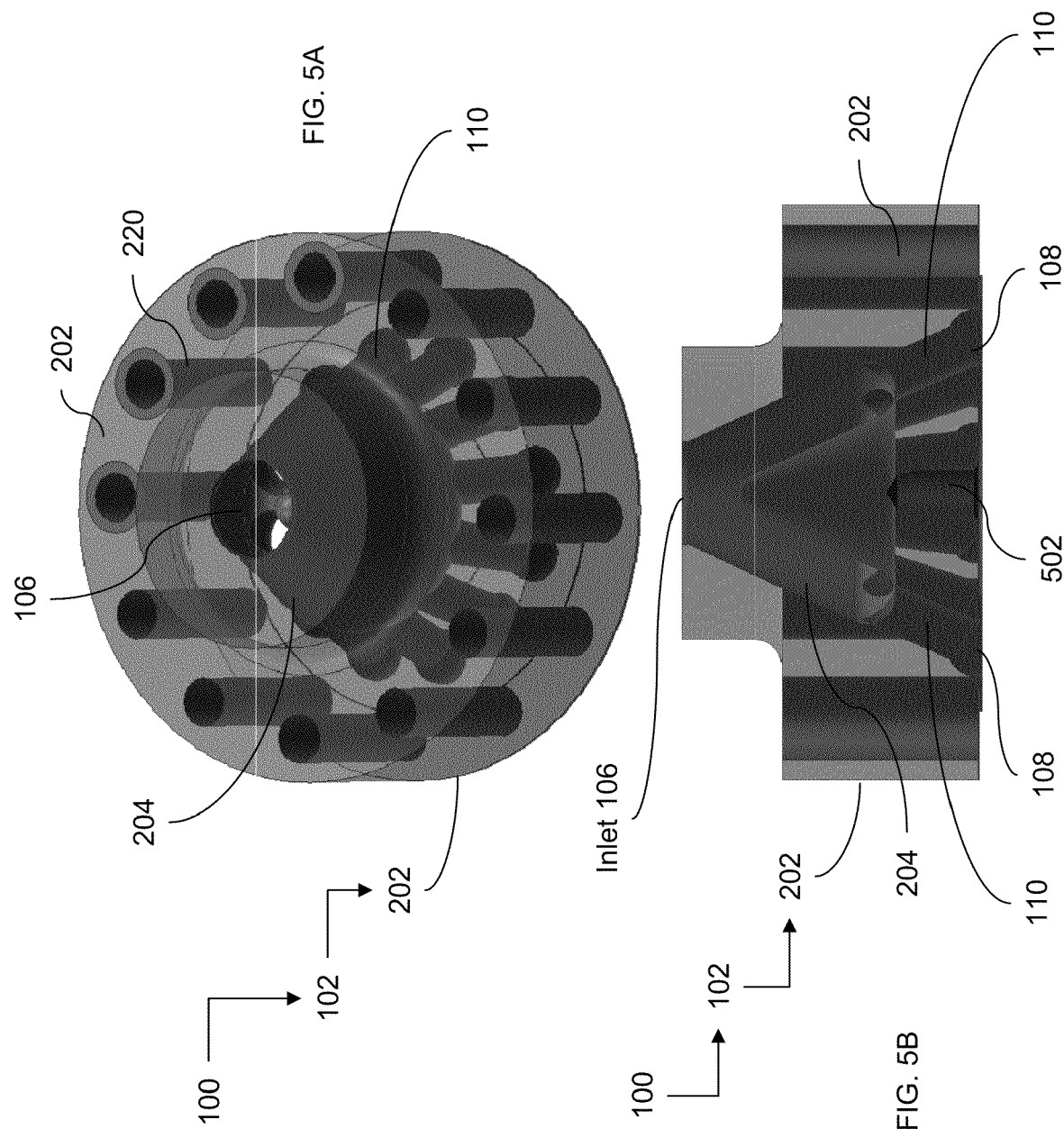

FIG. 5A depicts a perspective view of another example of the mold-tool system (100), and FIG. 5B depicts a cross-sectional view of the mold-tool system (100), in which the melt splitting zone (204) may be defined by the melt splitting device body (202). The melt splitting zone (204) may be cone-shaped, with an apex of the melt splitting device body (202) aligned at the single inlet (106) and a base of the melt splitting device body (202) aligned or directed at the multiple outlets (108). The uninterrupted melt channels (110) may extend inwardly toward the melt splitting zone (204). If so required, an alignment dowel (502) may be defined in the melt splitting device body (202). The alignment dowel (502) may be configured to align the melt splitting device body (202) with the manifold assembly (104).

The mold-tool system (100), may, optionally be adapted such that the melt splitting device (102) is configured to change direction of a melt flow from a cylindrical flow to an annular flow before the melt flow splits into the multiple outlets (108), as depicted in FIGS. 5B and 6B.

FIG. 6A depicts a perspective view of another example of the mold-tool system (100), and FIG. 6B depicts a cross-sectional view (along section A-A) of the mold-tool system (100), in which the melt splitting device (102) may have or include multiple pieces or components. Specifically, the melt splitting device body (202) may include (and is not limited to): an inlet body (602) that defines the single inlet (106), and may also include an outlet body (604) that defines the uninterrupted melt channels (110) and the multiple outlets (108). A connector (650) may be used for connecting the inlet body (602) with outlet body (604). Generally, the inlet body (602) and the outlet body (604) are configured to be securely sealably connectable together.

FIG. 7A depicts a perspective view of another example of the mold-tool system (100), and FIG. 7B depicts a cross-sectional view (along section A-A) of the mold-tool system (100), in which the melt splitting device (102) includes multiple pieces. Specifically, the melt splitting device body (202) may includes (and is not limited to) an inlet body (702) and an outlet body (704). The connector (650) connects the inlet body (702) with the outlet body (704). The outlet body (704) may define the uninterrupted melt channels (110) and the multiple outlets (108). The inlet body (702) may define the single inlet (106).

FIG. 8 depicts a schematic view of another example of the mold-tool system (100), in which the manifold assembly (104) may include (and is not limited to): a cross manifold assembly (142). The cross manifold assembly (142) may include a cross manifold body (800) that may define: a manifold inlet (806), a manifold outlet (808), and uninterrupted manifold channels (810). The uninterrupted manifold channels (810) may be similar to the uninterrupted melt channels (110).

FIG. 9 depicts a schematic view of another example of the mold-tool system (100), in which the manifold assembly (104) may include (and is not limited to): a main manifold assembly (144) having a main manifold body (900), a manifold inlet (906), a manifold outlet (908), and uninterrupted melt channels (910). The uninterrupted melt channels (910), may be similar to the uninterrupted melt channels (110). A connector hole (901) may be used for permitting connection of the main manifold body (900) to other components.

Figure 10:
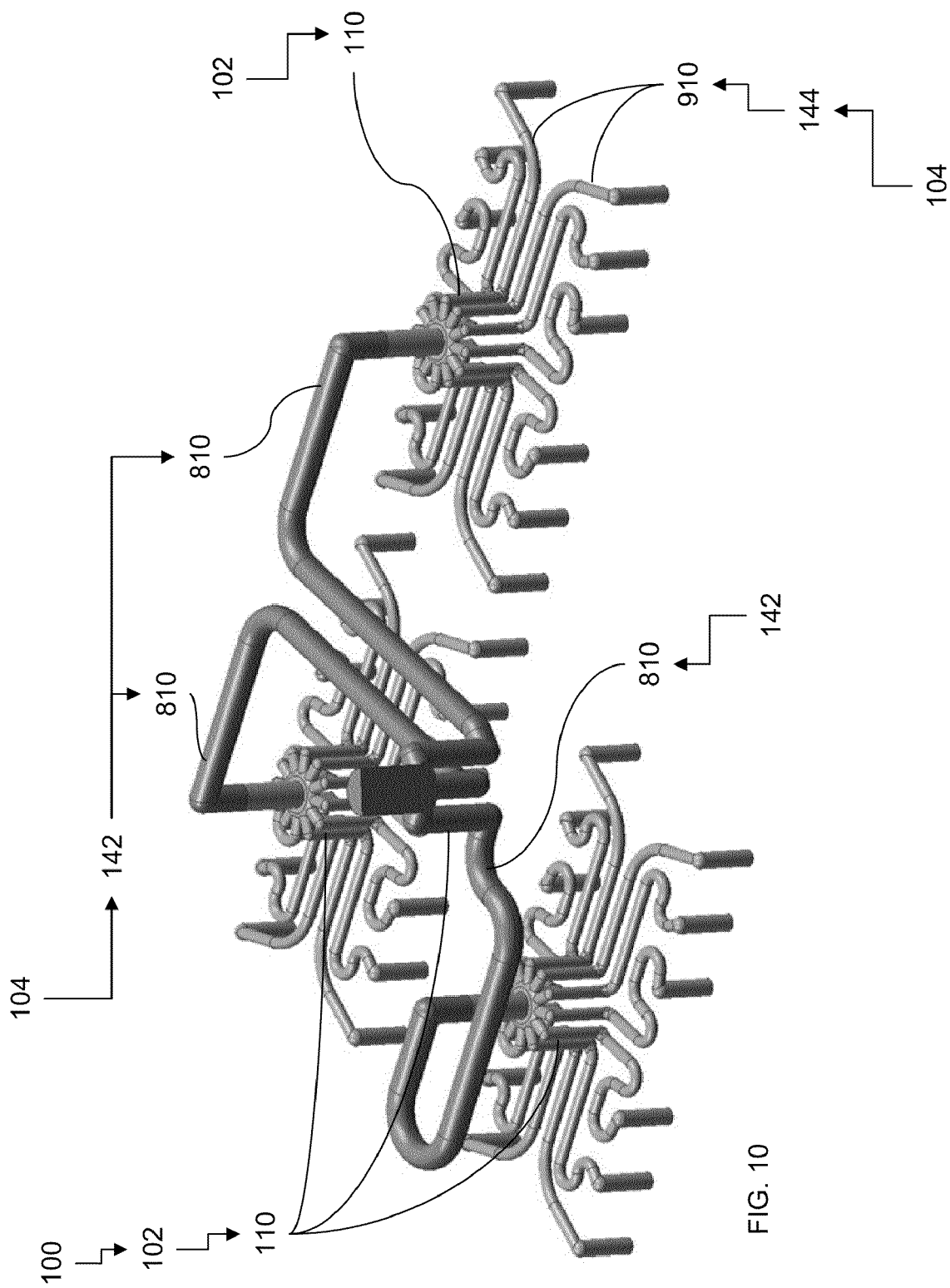

FIG. 10 depicts a schematic representation of the mold-tool system (100), showing the uninterrupted melt channels (110), the uninterrupted manifold channels (810) and the uninterrupted melt channels (910) without any surrounding structure.

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system (100), comprising:
a melt splitting device (102), including:
an upper melt splitting device (122), and
a plurality of lower melt splitting devices (124);
a manifold assembly (104), including:
a cross manifold assembly (142), and
a plurality of main manifold assemblies (144), wherein:
the upper melt splitting device (122) is configured for connection with a melt preparation device, the upper melt splitting device (122) is connected with the cross manifold assembly (142), and
the plurality of lower melt splitting devices (124) connect the cross manifold assembly (142) with a respective one of the plurality of main manifold assemblies (144).

2. The mold-tool system (100) of claim 1, wherein:
the upper melt splitting device (122) and the plurality of lower melt splitting devices (124) include:
a single inlet (106),
multiple outlets (108) that are set apart from the single inlet (106), and
uninterrupted melt channels (110) extending from the single inlet (106) and the multiple outlets (108).

3. The mold-tool system (100) of claim 1, wherein:
the upper melt splitting device (122) and the plurality of lower melt splitting devices (124) include:
a material that has a thermal conductivity that is different from the thermal conductivity of the material included in the manifold assembly (104).

4. The mold-tool system (100) of claim 1, wherein:
the upper melt splitting device (122) and the plurality of lower melt splitting devices (124) include:
a material that has a fatigue strength that is different than the fatigue strength of the material included in the manifold assembly (104).

5. The mold-tool system (100) of claim 2, wherein:
the uninterrupted melt channels (110) radiate axially outwardly from a direction that is perpendicular to a central axis extending through the single inlet (106).

6. The mold-tool system (100) of claim 2, wherein:
the uninterrupted melt channels (110) radiate symmetrically axially outwardly along an accurate angle relative to a central axis of the single inlet (106).

7. The mold-tool system (100) of claim 1, wherein:
the melt splitting device (102) includes a six way split.

8. The mold-tool system (100) of claim 1, wherein:
the melt splitting device (102) includes a 12 way split.

9. The mold-tool system (100) of claim 2, wherein:
the upper melt splitting device (122) and the plurality of lower melt splitting devices (124) include:
a melt splitting device body (202), and a melt splitting zone (204) is defined by the melt splitting device body (202), the melt splitting zone (204) is cone-shaped, with: (i) an apex of the melt splitting device body (202) aligned at the single inlet (106), and (ii) a base of the melt splitting device body (202) aligned or directed at the multiple outlets (108), and
the uninterrupted melt channels (110) extend inwardly toward the melt splitting zone (204).

10. The mold-tool system (100) of claim 1, wherein:
the upper melt splitting device (122) and the plurality of lower melt splitting devices (124) include:
a melt splitting device body (202), and a melt splitting zone (204) is defined by the melt splitting device body (202),
an alignment dowel (502) is defined in the melt splitting device body (202), and
the alignment dowel (502) is configured to align the melt splitting device body (202) with the manifold assembly (104).

11. The mold-tool system (100) of claim 2, wherein:
the upper melt splitting device (122) and the plurality of lower melt splitting devices (124) include:
a melt splitting device body (202), and a melt splitting zone (204) is defined by the melt splitting device body (202),
the melt splitting device body (202) includes:
an inlet body (602) that defines the single inlet (106), and
an outlet body (604) that defines the uninterrupted melt channels (110) and the multiple outlets (108); and
a connector (650) for connecting the inlet body (602) with the outlet body (604), and the inlet body (602) and the outlet body (604) are configured to be securely sealably connectable together.

12. The mold-tool system (100) of claim 2, wherein:
the upper melt splitting device (122) and the plurality of lower melt splitting devices (124) include:

an inlet body (702), the inlet body (702) may define the single inlet (106);
an outlet body (704), the outlet body (704) defines the uninterrupted melt channels (110) and the multiple outlets (108); and
a connector (650) connects the inlet body (702) with the outlet body (704).

13. The mold-tool system (100) of claim 2, wherein:
the cross manifold assembly (142) includes:
    a cross manifold body (800) that defines:
        a manifold inlet (806),
        a manifold outlet (808), and
        uninterrupted manifold channels (810) being similar to the uninterrupted melt channels (110).

14. The mold-tool system (100) of claim 1, wherein:
the plurality of main manifold assemblies (144) include:
    a main manifold body (900),
    a manifold inlet (906),
    a manifold outlet (908), and
    uninterrupted melt channels (910) being similar to the uninterrupted melt channels (110).

\* \* \* \* \*